United States Patent Office 3,700,620
Patented Oct. 24, 1972

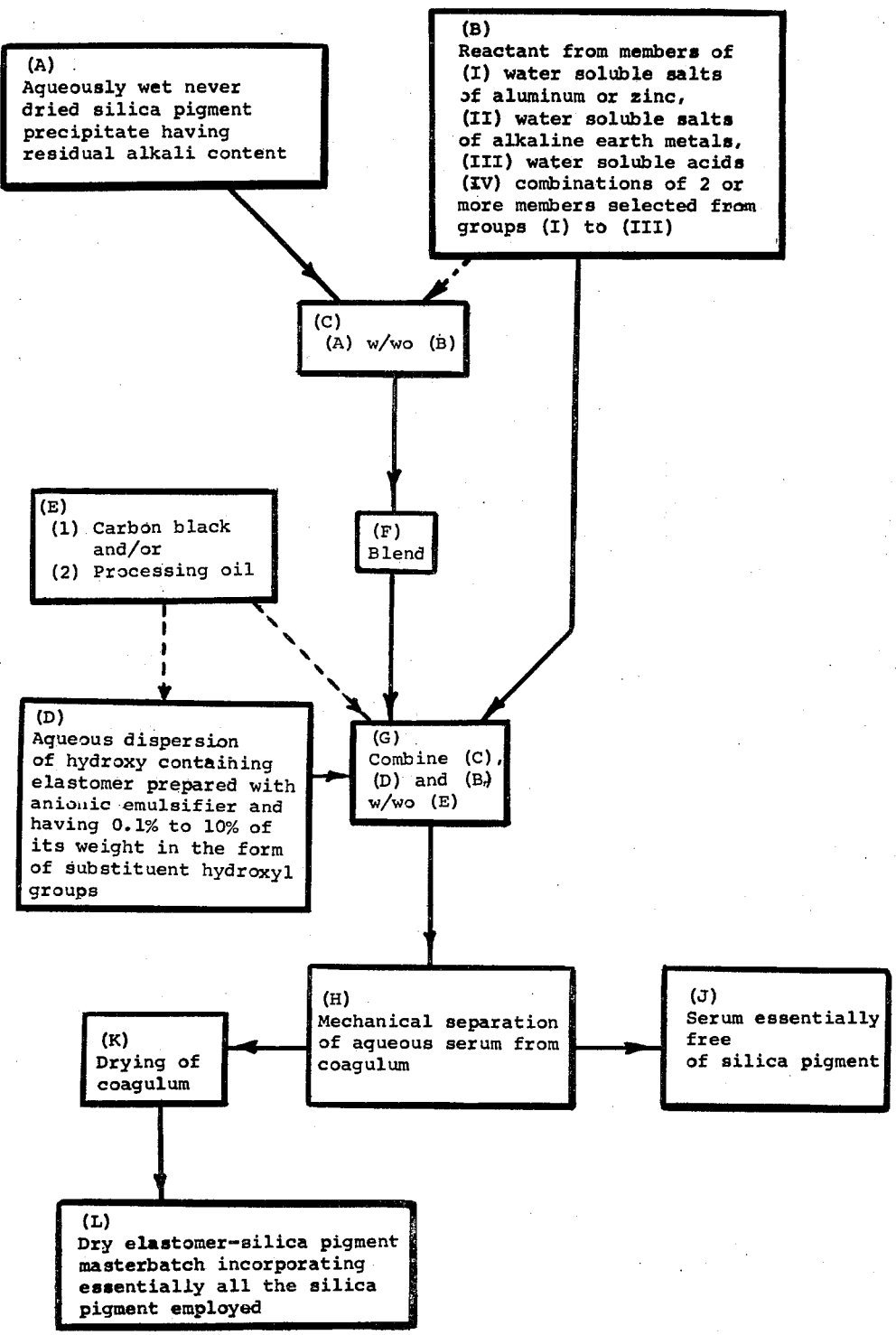

3,700,620
ELASTOMER-SILICA PIGMENT MASTERBATCHES AND PRODUCTION PROCESSES RELATING THERETO
Oliver W. Burke, Jr., Fort Lauderdale, Fla.
(1510 SW. 13th Court, Pompano Beach, Fla. 33061)
Continuation-in-part of application Ser. No. 798,216, Sept. 16, 1968, now abandoned, which is a division of application Ser. No. 611,250, Jan. 24, 1967, now Patent No. 3,523,096, which in turn is a continuation-in-part of applications Ser. No. 458,379 and Ser. No. 458,420, both May 24, 1965, both now abandoned, and Ser. No. 479,806, Aug. 16, 1965, now Patent No. 3,401,017. This application July 16, 1970, Ser. No. 55,487
Int. Cl. C08c 11/12; C08d 9/00
U.S. Cl. 260—33.6 AO                               8 Claims

ABSTRACT OF THE DISCLOSURE

Curbing of silica pigment losses and the promotion of uniformity of product in the preparation of an elastomer-silica pigment masterbatch is effected by (a) combining (1) an aqueous wet hydrated silica pigment precipitate which has a bound alkali content, which has been prepared by precipitation from an aqueous solution of alkali metal silicate, and which has been continuously maintained in an aqueously wet state without having been dried therefrom after its precipitation, with or without treatment with a selected reactant and (2) an aqueous dispersion of hydroxy containing elastomer and anionic dispersing agent, with or without (3) carbon black and/or processing oil, and (4) selected coagulant, and (b) recovering the resulting coagulum as a masterbatch, the steps prior to (b) having rendered the serum of the aqueous mixture essentially free of silica pigment. The product prepared by the process is a hydroxyl group containing elastomer-silica pigment masterbatch.

CROSS REFERENCE TO RELATED APPLICATIONS

This application is a continuation-in-part of copending applications Ser. No. 798,216, filed Sept. 16, 1968, now abandoned as a division of application Ser. No. 611,250, filed Jan. 24, 1967, now U.S. Pat. 3,523,096, said application Ser. No. 611,250 having been a continuation-in-part of earlier applications Ser. No. 458,420, filed May 24, 1965, now abzandoned; Ser. No. 458,379, filed May 24, 1965, now abandoned; and Ser. No. 479,806, filed Aug. 16, 1965, now U.S. Pat. 3,401,017, the disclosures all of which are incorporated herein by reference. Furthermore, this application is directed to a species of invention that was nonelected in applicant's copending application Ser. No. 55,384, filed July 16, 1970, and, pursuant to a restriction requirement, was withdrawn from consideration in that case.

BACKGROUND OF THE INVENTION

(1) Field of the invention

This invention relates to the preparation for the rubber trade of elastomer pigment masterbatches from elastomers and precipitated silica pigments.

(2) Description of the prior art

It is well known in the art that attempts to make masterbatches from elastomer latex and aqueously dispersed hydrated silica pigment by latex masterbatching have resulted in loss of large amounts of the hydrated silica pigment in the mother liquor, and in non-uniform masterbatches, and that even the addition of tetraethylenepentamine (Whitby, Synthetic Rubber, John Wiley & Sons, Inc., New York, 1954, p. 676) or glue, gelatin or casein (U.S. Pat. No. 2,616,860) has not provided a satisfactory solution to this problem. Also, to applicant's knowledge there is not at the present time any elastomer-silica masterbatch being offered on the commercial market.

BRIEF DESCRIPTION OF THE DRAWING

The single figure of the drawing is block-diagram illustrative of the process aspect of the invention.

SUMMARY OF THE INVENTION

It is known to those skilled in the art to prepare hydrated silica pigment for the reinforcement of rubber by precipitation from aqueous solutions of alkali metal silicates with the aid of carbon dioxide, avoiding formation of gelatinous masses—(i.e. the formation of silica gel)—and effecting the precipitation of a silica pigment in finely divided form (i.e. in particles in the reinforcing size range of about 0.015 to about 0.150 micron, preferably 0.02 to 0.06 micron) and to recover the pigment from the resulting wet silica pigment by filtration, washing and drying.

The wet silica pigments formed by precipitation from alkali metal silicate solutions with the aid of carbon dioxide have a bound alkali content in the range of about 0.1 to 10% by weight as $Na_2O$, and upon being dried in this state form aggregates, from the pigment particles of reinforcing size, which aggregates are of much greater than reinforcing size and will not adequately disperse (i.e. break down into particles of reinforcing size) when incorporated into rubber either by dry compounding or latex compounding.

When one treats such alkaline wet silica pigments with water soluble salts of alkaline earth metals, e.g. calcium salts, to substantially replace the bound alkali metal of the silica, the resulting pigment, when dried, still evidences the formation of aggregates of greater than reinforcing size, which do not adequately disperse in the rubber.

When one treats the alkaline wet silica pigments with the water soluble salts of aluminum and/or zinc, to substantially replace the alkali metal content thereof, the resulting acidic pigment, when dried, disperses to a greater extent in rubber, evidencing less aggregation than the neutral and alkaline products referred to above.

Finally, when one renders the wet silica pigment strongly acidic, by treatment with sulfuric acid and drying, the resulting strongly acidic product is more readily dispersible in rubber, and exhibits minimum aggregation; however, such highly acidic pigments are not practicable for use in the reinforcement of rubbers, since their acidity adversely effects vulcanization thereof.

Thus the drying of the wet silica pigment in alkaline, neutral, and moderately acidic states, in each instance causes the formation of aggregates of pigment particles to a greater or lesser degree which aggregation prevents adequate dispersion of the dry pigment in the rubber; the formation of these aggregates by the drying of the pigment is irreversible; and they remain mostly as aggregates that do not disperse in the rubber either by dry compounding or latex compounding.

This invention is based on the premise that uniformity of an elastomer-pigment masterbatch depends both on obtaining incorporation of a measured quantity of pigment in the masterbatch (e.g. avoiding loss of pigment in the serum in wet masterbatching) and adequate dispersion of the pigment in the elastomer in particles of reinforcing size (e.g. minimizing the pigment aggregation problem); and the present invention provides a process for accomplishing these ends by forming the masterbatch from aqueously wet hydrated silica pigment precipitates having a bound alkali content of 0.1 to 10% by weight as $Na_2O$;

which has been prepared by precipitation from an aqueous solution of alkali metal silicate with the aid of carbon dioxide; and which has continuously been maintained in an aqueously wet state after its precipitation without having been dried therefrom; and which is combined with an elastomer dispersion in the still aqueously wet state, with special provisions for avoiding loss of pigment in the aqueous serum and promoting uniformity of product in the masterbatch.

Thus the present invention, inter alia, provides a simple and efficient process for the curbing of silica pigment losses, and the promotion of uniformity of product in the preparation of masterbatches of measured silica pigment content. As shown in the drawing, the process consists essentially in (A) providing an aqueously wet never dried silica pigment precipitation having residual or bound alkali content; (B) providing reactant selected from the class consisting of the water soluble salts of aluminum, zinc, the alkaline earth metals, the mineral acids, and combinations of the foregoing, and (C) providing from (A) with or without a predetermined amount of reactant (B) wet silica pigment for use in the process; providing (D) an elastomer latex grafted with hydroxyl groups or containing hydroxyl groups and containing anionic emulsifier material coagulable with reactant from (E); providing (E) an aqueous solution of reactant selected from the water soluble salts of aluminum, zinc, the alkaline earth metals, the mineral acids, and combinations of the foregoing; (F) coagulating the elastomer of (D) in the presence of (C), with or without added carbon black and/or processing oil, with the coagulant (E), and recovering the coagulum as the masterbatch. Under these conditions the steps prior to the recovery render the serum resulting from the coagulation essentially free of silica pigment, thus assuring a uniform silica pigment content in the masterbatch. The achievement of this desideratum is evidenced by the fact that when the coagulum is mechancially removed from the serum, the serum is found to be essentially free of silica pigment, as indicated at (H) in the drawing. The dry elastomer-silica pigment masterbatch (J) thus incorporates essentially all of the silica pigment employed in (C), and this pigment is adequately and uniformly dispersed in the masterbatch.

In the several categories of the invention tabulated in Table A, the aqueous dispersions (e.g. latices) of hydroxy containing elastomers for masterbatching with the wet silica pigment may have concentrations of from 5 to 75%, preferably 10 to 40% dry solids by weight, with from 0.1 to 10%, preferably 0.5 to 5%, of the weight of the elastomers in the form of substituent hydroxyl groups. The several categories of the invention tabulated in Table A differ in the nature of the hydroxy containing elastomers from which the aqueous dispersions thereof are prepared, and fall into three general categories, i.e. (a) hydroxy containing homo- and copolymer elastomers, (b) hydroxy grafted homo- and copolymer elastomers and (c) the chemically hydroxylated homo- and copolymer unsaturated elastomers. As indicated in Table A: the hydroxy elastomers of category (a) may be prepared by emulsion or by solution polymerization; and the precursor polymers of categories (b) and (c) may be natural rubbers, or elastomers prepared by emulsion polymerization, or those prepared by solution polymerization, and may be grafted with hydroxy containing monomers in latex or solution form, and the unsaturated precursor elastomers may be chemically hydroxylated.

TABLE A

Hydroxy containing elastomers which, in aqueous dispersion stabilized with anionic dispersing agent, are masterbatched with wet silica pigment according to particular embodiments of this invention:

(a) Elastomeric polymers (homo- or copolymers) of hydroxy monomers with and without non-hydroxy comonomers:
   (1) prepared by emulsion polymerization
   (2) prepared by solution polymerization
(b) Elastomeric precursor-polymers grafted with hydroxy containing monomers:
   (1) natural rubber
     (a) so grafted in latex
     (b) so grafted in solution
   (2) Emulsion polymers (homo- and interpolymers)
     (a) so grafted in latex
   (3) Solution polymers (homo- and interpolymers)
     (a) so grafted in solution
     (b) so grafted in aqueous dispersion
(c) Elastomeric unsaturated precursor polymers chemically hydroxylated:
   (1) natural rubber
   (2) emulsion polymer (homo- and inter-)
   (3) solution polymer (homo- and inter-)

In each of categories (a) and (b) of Table A, hydroxy containing monomers provide the hydroxyl groups of the elastomers, these hydroxy containing monomers are the ethylenically unsaturated monomers having not over 20 carbon atoms and containing at least one hydroxyl group, and may be selected from the class of ethylenically unsaturated mono- and poly-hydroxylic monomers the members of which fall in the groups set forth in Table B.

TABLE B

Unsaturated mono- and poly-hydroxylic monomers having from 2 to 20 carbon atoms (1) Alcohol monomers
(2) Hydroxylic diene monomers
(3) Hydroxylic mono- and poly-carboxylic acid ester monomers
(4) Hydroxylic mono- and poly-carboxylic acid monomers
(5) Hydroxylic amido, imido and cyano monomers
(6) Hydroxylic vinyl sulfide monomers
(7) Hydroxylic vinyl ether monomers.

Examples of the monomers of Table B include: aromatic alcohols such as, e.g., vinyl benzyl alcohol, 2-phenyl allyl alcohol, vinyl betahydroxyethyl toluene, beta-hydroxyethyl styrene, etc.; aliphatic alcohols such as, e.g., 3-hydroxy butene-1, allyl alcohol, 4-hydroxy pentene-1, methallyl alcohol, 2-hydroxymethyl allyl alcohol, 2-chloromethyl allyl alcohol, etc.; hydroxylic dienes such as, e.g., 2-hyroxymethy butadiene-1,3, 2,3-bis(hydroxymethyl)butadiene-1,3, etc.; hydroxylic mono- and poly-carboxylic acid esters such as e.g., 2-hydroxyethyl acrylate,
methyl-α-(hydroxymethyl)-acrylate,
ethyl-α-(hydroxymethyl)-acrylate,
butyl-α-(2-hydroxyethyl)-acrylate,
2-hydroxypropyl acrylate or methacrylate,
3-hydroxypropyl acrylate or methacrylate,
methyl-α-(2-hydroxypropyl)-acrylate,
ethyl-α-(3-hydroxypropyl)-acrylate,
4-hydroxybutyl acrylate,
5-hydroxyamyl acrylate,
6-hydroxyhexyl acrylate,
7-hydroxyheptyl acrylate,
8-hydroxyoctyl acrylate,
9-hydroxynonyl acrylate,
10-hydroxydecyl acrylate,
2-hydroxyethyl methacrylate,
6-hydroxyhexyl methacrylate,
8-hydroxyoctyl methacrylate,
10-hydroxydecyl methacrylate,
3-hydroxypropyl crotonate,
5-hydroxyamyl crotonate,
6-hydroxyhexyl crotonate,
7-hydroxyheptyl crotonate,
10-hydroxydecyl crotonate, di(2-hydroxyethyl) maleate,
di(4-hydroxybutyl)-maleate,
di(6-hydroxyhexyl) maleate,
di(9-hydroxynonyl) maleate,
di(10-hydroxydecyl) maleate,
di(2-hydroxyethyl) fumarate,
di(2-hydroxypropyl) fumarate,
di(4-hydroxybutyl) fumarate,
di(6-hydroxyhexyl) fumarate,
di(10-hydroxydecyl) fumarate, and the like;
butyl-bis-(betahydroxyethyl)-itaconate ethyl betahydroxyethyl maleate,
2,3-dihydroxypropyl acrylate,
3,5-dihydroxyamyl crotonate,
6,10-dihydroxydecyl methacrylate,
di-2,6-dihydroxyhexyl maleate,
di-2-chloro 7-hydroxyheptyl fumarate and the like;
hydroxylated mono- and poly-carboxylic acid such as, e.g.,
alphahydroxymethyl crotonic acid,
hydroxymethyl fumaric acid,
hydroxypropyl maleic acid, etc.;
hydroxylic amido monomers such as, e.g.,
alphahydroxymethyl acrylamide, N-methylol acrylamide,
N-ethanol acrylamide,
N-propanol acrylamide,
N-methylol methacrylamide,
N-ethanol methacrylamide,
N-hydroxymethyl maleimide,
N-betahydroxypropyl maleimide;
alphahydroxymethyl acrylonitrile; etc.;
the hydroxylic vinyl sulfide or vinyl ether monomers such as e.g.:
β-hydroxyethyl vinyl sulfide,
β-hydroxyethyl vinyl ether,
2-hydroxypropyl vinyl sulfide,
5-hydroxypentyl vinyl ether,
6-hydroxyhexyl vinyl ether,
8-hydroxyoctyl vinyl ether,
10-hydroxydecyl vinyl ether,
thiodiglycol monovinyl ether,
thiodiglycol monovinyl sulfide,
diethyleneglycol monovinyl ether, and the like.

Most of the hydroxy containing elastomers of category (a) of Table A, more particularly those prepared from hydroxy containing monomers which do not homopolymerize to form elastomers, lie in the category of interpolymers. Such interpolymers may be prepared, for example, from ethylenically unsaturated monomers material consisting of from 2 to 98% by weight of non-hydroxy conjugated diene monomer material, 2 to 98% by weight of hydroxyl group containing ethylenically unsaturated monomer material copolymerizable with said conjugated diene monomer material and 0 to 96% by weight of other ethylenically unsaturated monomer material copolymerizable with said conjugated diene monomer material and said hydroxyl group containing ethylenically unsaturated monomer material; and further the said conjugated diene monomer material is selected from the group consisting of $C_2$–$C_{20}$ unsubstituted and hydrocarbon substituted, chloro-substituted, fluoro substituted and cyano-substituted butadiene-1,3, e.g., isoprene, piperlene, the hexadienes, 2-chlorobutadiene-1,3, and the like; and the hydroxyl group containing ethylenically unsaturated monomer material copolymerizable with the selected diene is selected from the class set forth in Table B, and the ethylenically unsaturated non-hydroxy containing monomers material copolymerizable with said conjugated diene monomer material and copolymerizable with said hydroxyl group containing ethylenically unsaturated monomer material is selected in various embodiments from the monomers set forth in Table C.

TABLE C

Typical non-hydroxyl containing $C_2$–$C_{20}$ monomers employable as co-monomers in Table A Olefins such as, e.g., ethylene, propylene, isobutylene, 3-methyl butene-1, butene-1, penetene-1, etc., mono- and poly-carboxylic acid esters such as, e.g., methyl methacrylate, ethyl acrylate, diethyl maleate, etc.; mono- and poly-carboxylic acids or anhydrides such as, e.g., acrylic acid, methacrylic acid, crotonic acid, fumaric acid, maleic acid, maleic anhydride, itaconic acid, etc.; the vinylidene halides such as, e.g., vinyl chloride, vinyl bromide, vinylidene chloride, etc.; monovinylidene aromatic compounds such as styrene; aryl substituted alkyl styrenes such as, e.g., ortho-meta and para-methylstyrenes, 2,4-dimethylstyrene, para-ethyl styrene, etc.; aryl substituted halostyrenes such as, e.g., ortho-, meta-, and para-chlorostyrenes or bromostyrenes, 2,4-dichlorostyrene, 2-methyl-4-chlorostyrene, acrylonitrile, methacrylonitrile and the like.

Precursor polymers

The precursor elastomeric polymers employable in categories (b) and (c) of Table A, include: the natural rubbers such as, e.g. Hevea, in latex or solution form; the emulsion polymerized elastomeric homo- and interpolymers, such as the diene polymer rubbers, e.g. polybutadiene, polyisoprene, polychloroprene, and the copolymers of conjugated diene monomers and monomers containing and copolymerizable therewith through a single ethylenically unsaturated group, e.g. butadiene-styrene, butadiene-acrylonitrile or methacrylonitrile, butadiene-acrylates or methacrylates; and rubbery copolymers of conjugated diene monomers with other vinylidene (including vinyl) monomers selected from the group set forth in Table C; and the solution polymerized elastomeric homo- and interpolymers from olefins and diene monomers such as, e.g. butyl rubber, polybutadiene, polyisoprene, polyethylene, polypropylene, ethylene-propylene copolymers, ethylene-propylene-diene terpolymers, butadiene-styrene copolymers, butadiene-ethylene copolymers, propylene-butene-1 copolymers, and other solution polymerized elastomers.

Carbon black

By the term "carbon black" as used herein is meant any carbon blacks suitable for use by the rubber industry and set forth under the title "carbon blacks" at pages 251 to 264 of the publication entitled "Materials and Compounding Ingredients for Rubber," compiled by J. V. Del Gatto, published by Rubber World, 1968, and herein incorporated by reference, e.g. Philblack O (TM), Statex K (TM), Statex 160 (TM), Kosmobile 77 (TM), Thermax (TM), and the like.

Processing oils

The term "processing oils" as used herein is meant rubber processing material of both liquid and solid types (if required the solids types can be converted to the liquid state for use herein with the aid of solvent or plasticizer) and include the processing materials set forth under "Plasticers and Softeners" at pp. 149 to 214 of the publication entitled "Materials and Compounding Ingredients for Rubber," compiled by J. V. Del Gatto, published by Rubber World, 1968, and herein incorporated by reference and among the types of processing materials especially suitable for use in this invention are (a) the coal tar oils and pitches e.g. Bardol (TM), Bardol B (TM); (b) the asphalts, e.g. BRH # (TM); (c) the petroleum oils including the paraffinic, naphthenic, aromatic, and highly aromatic categories, which are commercially available under trademark designations, Sunpar (TM), Sundex (TM), Sunthene (TM), Circosol (TM), and Shellflux (TM) oils, and the like, such as Circosol 2XH (TM), Sundex 53 (TM), Shell SPX 97 (TM), Dutrex-20, -419, -726, -757, -787 (TM), and Califlux TT (TM) and other oils suitable for rubber compounding or the oil extension of synthetic rubber; (d) the coumarone-indene oils and resins, e.g. Cumar Resin RH, -P10, -T(TM); (e) the liquid ester type plasticizers, e.g. dibutyl phthalate, di-(2-ethylhexyl) phthalate, diglycol laurate, dibenzyl sebacate, tributoxyethyl phosphate, tricresyl phosphate and the like; (f) the phenol formaldehyde thermoplastic resins, e.g. Durez 12687, 12707 (TM) and the like; (g) the hydrocarbon resins, e.g. Neville-LX 782, -LX 125, (TM), ParaFlux, Para Resin 2457 (TM); (h) the hydrocarbon resin-coumarone indene polymers, e.g. Picco Resins (TM); (i) the pine tars and pine tar oils, rosin and rosin oils, and tall oil and its derivatives, e.g. PT–101, PT–401, PT–800 (TM); and the like.

The chemical hydroxylation of the precursor unsaturated elastomeric polymers in accordance with category (c) of Table A, may be effected in any known or suitable manner, e.g. by treatment of the unsaturated elastomeric polymer with peracetic acid.

In the following description of preferred embodiments, the examples disclose suitable procedures for preparing the aqueous dispersion or latex of grafted polymers with hydroxyl groups, see Examples 1–4, and interpolymers with hydroxyl groups see Examples 18–23, and the combination of these hydroxyl graft polymers and interpolymers with wet silica pigment to form masterbatches is set forth in Examples 5–17 and in Examples 24–57.

Description of the preferred embodiments

Preferred embodiments of the present invention avoid the use of organic additives such as tetraethylene-pentamine, glue, gelatin, casein, etc., which increase the cost and may affect the curing properties of the masterbatch. The invention, inter alia, may be used to improve wet silica masterbatching and masterbatches using any aqueously wet never dried silica pigment containing bound alkali, and is applicable to the formation of masterbatches therewith with grafted and non-grafted elastomer latices prepared with anionic emulsifier coagulable with the coagulant.

EXAMPLES

The following examples will serve to illustrate the invention in more detail:

Silica Preparation and Examples 1–57

The aqueous slurry of precipitated silica employed in Examples 5–17 and 24–57 was prepared in a manner similar to Example 9 of U.S. Pat. No. 3,250,594 except that the ratio of 41° Bé. commercial sodium silicate ($Na_2O/(SiO_2)_{3.22}$) to water was approximately 1 to 4.5 by weight. The carbon dioxide was supplied to the sodium silicate with the aid of a single submerged combustion burner up to the appearance of the Tyndall effect and with two such burners thereafter. The use of the submerged combustion burners was according to U.S. Pat. No. 3,372,046. The silica product was filtered and washed to reduce the soluble salts to the range of 1 to 2% and the filter cake and a solids of approximately 10% by weight. The resulting aqueous silica slurry was designated wet alkaline silica pigment-I, and had a bound alkali content of about 1.5% by weight as $Na_2O$, and a serum pH of about 8.5 (8.5–9.5).

The just described filter cakes having a solids content of about 10% by weight are embraced within the term "wet silica pigment" (which herein connotes aqueously wet silica pigment) as are wet pigments of more reduced water content which can be prepared by pressing the said filter cakes, or of augmented water content, e.g. slurries having less than 10% solids content, and the terms "aqueously wet silica pigment" or "aqueously wet state," as employed herein are generic to all such conditions. Thus these terms as employed herein embrace aqueously wet silica pigment materials having a solids content in the range of about 1% to about 65% solids, dry basis, by weight; however, for economy in the practice of the invention wet silica pigments of reduced water content (solids content 8 to 36%) are preferred.

To determine pigment quality a portion of wet silica pigment-II was dried at 105° C., micropulverized and compounded as set forth in Table I hereof.

TABLE I

| Compound ingredients: | Quantities (pts. wt.) |
|---|---|
| Butadiene-styrene copolymer [1] | 100 |
| Silica pigment-II dried | 60 |
| Antioxidant, 2,2'-methylene-bis (4-methyl-6-t.-butylphenol) | 2.0 |
| Magnesium oxide | 4.0 |
| Paracoumarone-indene resin [2] | 10.0 |
| Zinc oxide | 1.0 |
| N-tert-butyl-2-benzothiazole-sulphenamide | 0.75 |
| N,N'-di-o-tolylguanidine | 1.5 |
| Triethanolamine | 1.0 |
| Phthalic anhydride | 0.75 |
| Sulfur | 2.25 |

[1] SBR 1502.
[2] Cumar Resin RH, a trademark product of Allied Chemical Corp.

The compound was aged over-night, re-milled and cured for 45 minutes at 287° F.

The physical test data for the vulcanizate so prepared with the foregoing silica pigment is set forth in Table II hereof.

TABLE II

| Silica tested (in vulcanizate) | Silica Pigment-II |
|---|---|
| Hardness (Shore A) | 72 |
| Tensile (p.s.i.) | 3530 |
| Modulus (300%) | 1140 |
| Elong. (percent) | 575 |

In Table III grafted latex having hydroxyl groups was prepared from butadiene-styrene latex.

In Table IV the alkaline wet silica pigment was combined with the hydroxyl group containing latices prepared according to Table III and the solids coagulated with water soluble magnesium and zinc salts and the masterbatch dried.

In Table V the alkaline silica and the hydroxyl group containing graft latices were coagulated with an aqueous solution of aluminum sulfate and the masterbatch was dried.

In Table VI the examples were prepared similar to Table V except that the coagulant was sulfuric acid and the masterbatch was dried.

In Table VII the alkaline silica was blended with carbon black (and processing oil in Example 14) and latex and coagulated with aluminum sulfate, sulfuric acid, and calcium chloride.

In Tables VIII and IX copolymers were prepared by copolymerizing hydroxyl group containing monomers to form a latex.

In Table IX to XVII the alkaline silica pigments were treated with acid, aluminum sulfate and calcium chloride and combined with latices of copolymers containing hydroxyl groups and coagulated with a further quantity of reactants, then the masterbatch was dried.

In Table XVIII to XX treated silica pigment is combined with carbon black with and without processing oil and then combined with a latex of copolymer containing hydroxyl groups and coagulated with a further quantity of reactant and the masterbatch is dried.

In the examples the elastomer latices exemplified and the slurries of said silica pigment-I with or without treatment were blended together, preferably by high speed stirring, before combining them with the coagulant and in some instances creaming occurs prior to combining with the coagulant. In some of the examples, while continuing the stirring, the reactant-aqueous solution was progressively added until coagulation throughout the mixture occurred, and on separation of the coagulum from the aqueous phase the serum was essentially free of silica pigment.

In the case of other examples, the blended hydroxyl group containing copolymer or graft-polymer latex and aqueous silica pigment slurry were run into the coagulating solution while stirring; this procedure also yielded a coagulum comprising essentially all of the elastomer and silica pigment, leaving the serum completely or essentially free of the pigment.

It has also been found that streams of the hydroxy group containing copolymer latex and graft elastomer latex, the silica pigment slurry, with or without reactant treatment, and the coagulant, according to any of these examples, can be run continuously into the coagulation vessel while stirring, and that this procedure also will yield a coagulum containing essentially all of the silica pigment, leaving essentially no silica pigment in the aqueous phase. Thus the processes of the examples are adaptable for either continuous or batch production of the masterbatch. In those instances in which an oil-rubber-silica pigment masterbatch is desired, up to about 45% of oil based on the elastomer is added during or after formation of the masterbatch according to the following examples, preferably with a small amount of ammonium hydroxide to aid dispersion of the oil into the elastomer, and it will thus be understood that the masterbatch and elastomer dispersion contemplated by the invention may contain a minor proportion of oil. Similarly in the respective examples, any soluble aluminum salt may be substituted for the hydrated aluminum sulfate, e.g. aluminum ammonium sulfate or aluminum sodium sulfate, and the coagulant solution contemplated by the invention may thus comprise minor amounts of ammonium and/or alkali metal salts without detriment to the process. Furthermore the elastomer latex and/or the aqueous dispersion of silica pigment and/or the aqueous coagulant solution may contain a small proportion of ammonium hydroxide which appears in certain instances to facilitate practice of the invention. When carbon black is also to be included in the elastomer silica pigment masterbatch, it may be incorporated as an aqueous slurry along with the slurry of the silica pigment.

Polymer-silica masterbatches may also be prepared containing processing oils and/or carbon black as previously described to obtain oil and/or carbon black containing elastomer-silica pigment masterbatches, without departing from the invention. In such practice, from 0 to 65 parts by weight of carbon black may be employed (with the limitation that the total quantity of silica pigment and carbon black, dry basis, not exceed 100 parts by weight, per 100 parts of the elastomers) and/or from 0 to 45 parts by weight of processing oil may be employed, by combining with the elastomer latex and silica pigment slurry prior to the coagulation thereof by the aqueous coagulant as set forth in the drawing. Such combinations may be effected in any suitable way, e.g. the carbon black may be added as an aqueous slurry and the processing oil as an aqueous dispersion preferably with the anionic emulsifying agent and/or ammonium hydroxide.

In preferred embodiments of this invention, the oleophilic amine treated wet silica pigment being in a slurry form, the carbon black and/or processing oil may be added directly to the said slurry without any prior aqueous dispersement, and with the aid of a high shear mixer, e.g. a Waring Blender, a uniform dispersion of the combination is readily obtained.

The following Examples 1–57 are illustrative of such modes of practicing the invention.

TABLE III
Polymer latex grafted with hydroxyl groups
[Parts by wt.]

| Example | 1 | 2 | 3 | 4 |
|---|---|---|---|---|
| (A) Grafted latex-hydroxyl groups: | | | | |
| (a) Precursor latex-aqueous: | | | | |
| Butadiene-styrene [1] | 510 | 510 | 510 | 520 |
| Dry basis | 100 | 100 | 100 | 100 |
| Water | 100 | 100 | 100 | 100 |
| 5.6% aqueous ammonia | | | 20 | |
| (b) Monomer: | | | | |
| Hydroxyethyl-methacrylate | 5 | | | 2.5 |
| 2-hydroxyethylvinyl sulfide | | 5 | | |
| Hydroxylpropyl-methacrylate | | | 5 | |
| Benzene | 10 | 10 | 10 | |
| (c) Catalyst: | | | | |
| Cumene hydroperoxide | 1 | 1 | 1 | 1 |
| 10% aqueous tetraethylene-pentamine | 4 | 4 | 4 | 2 |
| (d) Polymerization condition: | | | | |
| Temp., °C | 50 | 50 | 50 | 50 |
| Hours | 8 | 8 | 8 | 2.5 |
| (e) Short step: | | | | |
| Hydroquinone | 0.2 | 0.2 | 0.2 | 0.2 |
| Sodium sulfide | 0.02 | 0.02 | 0.02 | 0.02 |
| Water | 4 | 4 | 4 | 4 |

[1] SBR-1502 latex (TS=19.4%).

TABLE IV
Silica-polymer masterbatch
[Parts by wt.]

| Example | 5 | 6 | 7 |
|---|---|---|---|
| (A) Silica pigment slurry: | | | |
| Alkaline silica pigment I (pH=8.5–9.5) | 25 | 25 | 25 |
| Dry solids basis | 2.5 | 2.5 | 2.5 |
| Water | 40 | 40 | 40 |
| (B) Grafted latex: | | | |
| Example 1 | 40 | | |
| Example 2 | | 30 | |
| Example 3 | | | 40 |
| Antioxidant [1] | 0.1 | 0.1 | 0.1 |
| (C) Coagulant: | | | |
| 2% magnesium sulfate | 15 | | |
| 2% zinc sulfate | | 18 | 18 |
| (D) Combine (A) and (B) then (C): | | | |
| Blend, (X) | X | X | X |
| Serum pH | 8.0 | 6.4 | 6.4 |
| Silica in serum | None | None | None |
| (E) Masterbatch: | | | |
| Filter and wash (X) | X | X | X |
| Dried (105° C.) (X) | X | X | X |

[1] Antioxidant is 2,2'-methylene-bis-(4-methyl-6-t.-butylphenol).

TABLE V
Silica-polymer masterbatch
[Parts by wt.]

| Example | 8 | 9 | 10 |
|---|---|---|---|
| (A) Silica pigment slurry: | | | |
| Alkaline silica pigment I (pH=8.5–9.5) | 25 | 25 | 25 |
| Dry solids basis | 2.5 | 2.5 | 2.5 |
| Water | 40 | 40 | 40 |
| (B) Grafted latex: | | | |
| Example 2 | 40 | | |
| Example 3 | | 30 | |
| Example 4 | | | 30 |
| pH | 6.0 | 7.0 | 6.0 |
| Antioxidant [1] | 0.1 | 0.1 | 0.1 |
| (C) Coagulant: 2% aluminum sulfate [2] | 30 | 30 | 30 |
| (D) Combine (A) and (B) then (C): | | | |
| Blend, (X) | X | X | X |
| Serum pH | 4.5 | 5.5 | 5.5 |
| Silica in serum | None | None | None |
| (E) Masterbatch: | | | |
| Filter and wash (X) | X | X | X |
| Dried (105° C.) (X) | X | X | X |

[1] Antioxidant is 2,2'-methylene-bis-(4-methyl-6-t.-butylphenol).
[2] Aluminum sulfate $Al_2(SO_4)_3 \cdot 14H_2O$.

TABLE VI
Silica-polymer masterbatch
[Parts by wt.]

| Example | 11 | 12 | 13 |
|---|---|---|---|
| (A) Silica pigment slurry: | | | |
| Alkaline silica pigment I (pH=8.5-9.5) | 25 | 25 | 25 |
| Dry solids basis | 2.5 | 2.5 | 2.5 |
| Water | 40 | 40 | 40 |
| (B) Grafted latex: | | | |
| Example 2 | 30 | | |
| Example 3 | | 30 | |
| Example 4 | | | 30 |
| Antioxidant [1] | 0.1 | 0.1 | 0.1 |
| (C) Coagulant: 2% sulfuric acid | 6 | 8 | 6 |
| (D) Combine (A) and (B) then (C): | | | |
| Blend, (X) | X | X | X |
| Serum pH | 3.0 | 3.0 | 3.0 |
| Silica in serum | None | None | None |
| (E) Masterbatch: | | | |
| Filter and wash (X) | X | X | X |
| Dried (105° C.) (X) | X | X | X |

[1] Antioxidant is 2,2'-methylene-bis-(4-methyl-6-t.-butylphenol).

TABLE VII
Silica-polymer masterbatch including carbon black and processing oil
[Parts by wt.]

| Example | 14 | 15 | 16 | 17 |
|---|---|---|---|---|
| (A) Silica pigment slurry: | | | | |
| Alkaline silica pigment I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Carbon black and processing oil: | | | | |
| Philblack O [1] | 5 | | | 5 |
| Thermax [1] | | 5 | | |
| Statex 160HR [1] | | | 5 | |
| Circosol 2XH [2] | 1 | | | |
| (C) Combine (A) and (B): blend,[3] min. | 0.5 | 0.5 | 0.5 | 0.5 |
| (E) Grafted latex: | | | | |
| Example 2 | 120 | 120 | | |
| Example 3 | | | 100 | |
| Example 4 | | | | 90 |
| (F) Combine (C) and (E): blend, (X) | X | X | X | X |
| (G) Coagulant: | | | | |
| 2% aluminum sulfate [4] | 12 | 12 | | |
| 2% sulfuric acid | | | 6 | |
| 2% calcium chloride | | | | 10 |
| (H) Combine (F) and (G): | | | | |
| Blend, (X) | X | X | X | X |
| Serum pH | 4.5 | 4.5 | 3.5 | 8.0 |
| (I) Masterbatch: | | | | |
| Filter and wash (X) | X | X | X | X |
| Dried (105° C.) (X) | X | X | X | X |

[1] Carbon black, a trademark product.
[2] Processing oil, a trademark product.
[3] Waring blender, a trademark product.
[4] Aluminum sulfate $Al_2(SO_4)_3 \cdot 14H_2O$.

TABLE VIII
Preparation polymer latex with hydroxyl groups
[Parts by wt.]

| Example | 18 | 19 | 20 |
|---|---|---|---|
| (A) Polymer latex: | | | |
| Recipe: | | | |
| Tallow soap | 5 | 6 | 5 |
| Water | 180 | 220 | 180 |
| Styrene | 20 | 20 | 20 |
| Hydroxyethyl methacrylate | | 3 | |
| Hydropropyl methacrylate | 5 | | |
| N-methylol methacrylamide (60% aqueous) | | | 5 |
| Butadiene-1,3 | 80 | 80 | 80 |
| Potassium persulfate | 1 | 1 | 1 |
| Mercaptan MTM [1] | 0.8 | 0.8 | 0.8 |
| Conditions: | | | |
| Temp., °C | 50 | 50 | 50 |
| Hours | 6 | 4 | 6 |
| Short stop [2] (X) | X | X | X |
| Latex vacuum stripped (X) | X | X | X |
| Polymer yield: | | | |
| Conversion, percent | 91 | 57 | 76 |
| Total solids, percent | 35 | 19 | 29 |

[1] A trademark product, $C_{12}$, $C_{14}$ and $C_{16}$ tertiary mercaptan.
[2] 0.5 pts. dinitrophenol.

TABLE IX
Preparation polymer latex with hydroxyl groups
[Parts by wt.]

| Example | 21 | 22 | 23 |
|---|---|---|---|
| (A) Polymer latex: | | | |
| Recipe: | | | |
| Tallow soap | 5 | 5 | 5 |
| Water | 180 | 180 | 180 |
| Styrene | 20 | 20 | 15 |
| Acrylonitrile | | | 5 |
| Hydroxypropylmethacrylate | 5 | | |
| N-methylolmethacrylamide (60% aqueous) | | 5 | 5 |
| Butadiene-1,3 | 80 | 80 | 80 |
| Potassium persulfate | 1 | 1 | 1 |
| Mercaptan MTM [1] | 0.8 | 0.8 | 0.8 |
| Conditions: | | | |
| Temp. °C | 50 | 50 | 50 |
| Hours | 4 | 6.5 | 6 |
| Short stop [2] (X) | X | X | X |
| Latex vacuum stripped (X) | X | X | X |
| Polymer yield: | | | |
| Conversion, percent | 34 | 58.8 | 62 |
| Total solids, percent | 13.1 | 22 | 23.8 |

[1] A trademark product, $C_{12}$, $C_{14}$ and $C_{16}$ tertiary mercaptan.
[2] 0.5 pts. dinitrophenol.

TABLE X
Silica-polymer masterbatch
[Parts by wt.]

| Example | 24 | 25 | 26 |
|---|---|---|---|
| (A) Silica pigment slurry: | | | |
| Alkaline silica pigment I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% Aluminum sulfate [1] | 8.5 | 8.5 | 8.5 |
| (C) Combine (A) and (B): Blend, (X) | X | X | X |
| (D) Elastomer latex-Table VI: | | | |
| Example 18 | 14.3 | 14.3 | 14.3 |
| Dry solids basis | 5 | 5 | 5 |
| Antioxidant [2] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% sulfuric acid | | | 4 |
| 2% magnesium sulfate | | 10 | |
| 2% calcium chloride | 10 | | |
| pH | 5.5 | 6.0 | 3.5 |
| (G) Combine (E) and (F): | | | |
| Blend, (X) | X | X | X |
| Silica in serum | None | None | None |
| (H) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Antioxidant 2,2'-methylene-bis(4-methyl-6-t.-butylphenol).

TABLE XI
Silica-polymer masterbatch
[Parts by wt.]

| Example | 27 | 28 | 29 |
|---|---|---|---|
| (A) Silica pigment slurry: | | | |
| Alkaline silica pigment I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% aluminum sulfate [1] | 8.5 | 8.5 | 8.5 |
| (C) Combine (A) and (B): Blend, (X) | X | X | X |
| (D) Elastomer latex—Table VIII: | | | |
| Example 18 | 14.3 | 14.3 | 14.3 |
| Dry solids basis | 5 | 5 | 5 |
| Antioxidant [2] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% calcium chloride | 10 | | |
| 2% magnesium sulfate | | 10 | |
| 2% sulphuric acid | | | 3.8 |
| pH | 5.5 | 6.4 | 3.5 |
| (G) Combine (E) and (F): | | | |
| Blend, (X) | X | X | X |
| Silica in serum | None | None | None |
| (H) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Antioxidant (2,2'-methylene-bis-(4-methyl-6-t.-butylphenol).

TABLE XII
Silica-polymer masterbatch
[Parts by wt.]

| Example | 30 | 31 | 32 |
|---|---|---|---|
| (A) Silica pigment slurry: | | | |
| Alkaline silica pigment I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% aluminum sulfate [1] | 8.5 | 8.5 | 8.5 |
| (C) Combine (A) and (B): Blend, (X) | X | X | X |
| (D) Elastomer latex—Table VIII: | | | |
| Example 19 | 26.3 | 26.3 | 26.3 |
| Dry solids basis | 5 | 5 | 5 |
| Antioxidant [2] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% calcium chloride | 10 | | |
| 2% magnesium sulfate | | 10 | |
| 2% sulphuric acid | | | 3.8 |
| (G) Add (E) to (F): | | | |
| Blend, (X) | X | X | X |
| pH | 5.5 | 6.4 | 3.5 |
| Silica in serum | None | None | None |
| (H) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Antioxidant 2,2'-methylene-bis(4-methyl-6-t.-butylphenol).

TABLE XIII
Silica-polymer masterbatch
[Parts by wt.]

| Example | 33 | 34 | 35 |
|---|---|---|---|
| (A) Silica pigment slurry: | | | |
| Alkaline silica pigment I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% aluminum sulfate [1] | 8.5 | 8.5 | 8.5 |
| (C) Combine (A) and (B): blend, (X) | X | X | X |
| (D) Elastomer Latex—Table VIII: | | | |
| Example 20 | 17.3 | 17.3 | 17.3 |
| Dry solids basis | 5 | 5 | 5 |
| Antioxidant [2] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% calcium chloride | 10 | | |
| 2% magnesium sulfate | | 10 | |
| 2% sulphuric acid | | | 3.8 |
| (G) Add (E) to (F): | | | |
| Blend, (X) | X | X | X |
| Silica in serum | None | None | None |
| pH | 6.4 | 6.4 | 3.5 |
| (H) Masterbatch: | | | |
| Filter and wash (X) | X | X | X |
| Dried (105° C.) (X) | X | X | X |

[1] Aluminum sulfate $Al_2(SO_4)_3 \cdot 14H_2O$.
[2] Antioxidant 2,2'-methylene(bis-4-methyl-6-t.-butylphenol).

TABLE XIV
Silica-polymer masterbatch
[Parts by wt.]

| Example | 36 | 37 | 38 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% sulfuric acid | 4.5 | 4.5 | 4.5 |
| (C) Combine (A) and (B): Blend, (X) | X | X | X |
| (D) Elastomer latex—Table VIII: | | | |
| Example 18 | 14.3 | 14.3 | 14.3 |
| Dry solids basis | 5 | 5 | 5 |
| Antioxidant [1] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% aluminum sulfate [2] | 10 | 10 | 10 |
| Water | 40 | 40 | 40 |
| (G) Add (E) to (F): | | | |
| Blend, (X) | X | X | X |
| pH | 4.5 | 4.5 | 4.5 |
| Silica in serum | None | None | None |
| (H) Masterbatch: | | | |
| Filter and wash (X) | X | X | X |
| Dried (105° C.) (X) | X | X | X |

[1] Antioxidant 2,2'-methylene-bis(4-methyl-6-t.-butylphenol).
[2] Aluminum sulfate $Al_2(SO_4)_3 \cdot 14H_2O$.

TABLE XV
Silica-Polymer masterbatch
[Parts by wt.]

| Example | 39 | 40 | 41 |
|---|---|---|---|
| (A) Silica pigment slurry: | | | |
| Alkaline silica pigment-I (pH=8.5-9.5) | 25 | 25 | 25 |
| Dry solids | 2.5 | 2.5 | 2.5 |
| Water | 40 | 40 | 40 |
| (B) Reagent-aqueous solution: 2% calcium chloride | 5.0 | 5.0 | 5.0 |
| (C) Combine (A) and (B): Blend, (X) | X | X | X |
| (D) Elastomer latex—Table VIII: | | | |
| Example 19 | 26.3 | 26.3 | 26.3 |
| Dry solids basis | 5 | 5 | 5 |
| Antioxidant [1] | 0.1 | 0.1 | 0.1 |
| Water | 40 | 40 | 40 |
| (E) Combine (C) and (D): Blend (X) | X | X | X |
| (F) Reactant-aqueous solution: | | | |
| 2% aluminum sulfate [2] | 10 | 10 | 10 |
| Water | 40 | 40 | 40 |
| (G) Add (E) to (F): | | | |
| Blend, (X) | X | X | X |
| pH | 4.5 | 4.5 | 4.5 |
| Silica in serum | None | None | None |
| (H) Masterbatch: | | | |
| Filter and wash (X) | X | X | X |
| Dried (105° C.) (X) | X | X | X |

[1] Antioxidant 2,2'-methylene-bis(4-methyl-6-t.-butylphenol).
[2] Aluminum sulfate $Al_2(SO_4)_3 \cdot 14H_2O$.

TABLE XVI
Silica-polymer masterbatch
[Parts by wt.]

| Example | 42 | 43 | 44 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% magnesium sulfate | 5.5 | 5.5 | 5.5 |
| (C) Combine (A) and (B): Blend, (X) | X | X | X |
| (D) Elastomer latex—Table VIII: | | | |
| Example 20 | 17.3 | 17.3 | 17.3 |
| Dry solids basis | 5 | 5 | 5 |
| Antioxidant [1] | 0.1 | 0.1 | 0.1 |
| Water | 40 | 40 | 40 |
| (E) Combine (C) and (D): Blend, (X) | X | X | X |
| (F) Reactant-aqueous solution: | | | |
| 2% aluminum sulfate [2] | 10 | 10 | 10 |
| Water | 40 | 40 | 40 |
| (G) Add (E) to (F): | | | |
| Blend, (X) | X | X | X |
| pH | 4.5 | 4.5 | 4.5 |
| Silica in serum | None | None | None |
| (H) Masterbatch: | | | |
| Filter and wash (X) | X | X | X |
| Dried (105° C.) (X) | X | X | X |

[1] Antioxidant 2,2'-methylene-bis(4-methyl-6-t.-butylphenol).
[2] Aluminum sulfate $Al_2(SO_4)_3 \cdot 14H_2O$.

TABLE XVII
Silica-polymer masterbatch
[Parts by wt.]

| Example | 45 | 46 | 47 |
|---|---|---|---|
| (A) Silica pigment slurry: | | | |
| Alkaline silica pigment-I pH=8.5-9.5 | 25 | 25 | 25 |
| Dry solids basis | 2.5 | 2.5 | 2.5 |
| Water | 40 | 40 | 40 |
| (B) Reagent-aqueous solution: 2% aluminum sulfate [1] | 8.5 | 8.5 | |
| (C) Combine (A) and (B): Blend, (X) | X | X | X |
| (D) Elastomer latex—Table VI: | | | |
| Example 21 | 38 | | |
| Example 22 | | 23 | |
| Example 23 | | | 21 |
| Dry solids basis | 5 | 5 | 5 |
| Water | 50 | 50 | 50 |
| Antioxidant [2] | 0.1 | 0.1 | 0.1 |
| (E) Combine (C) and (D): Blend, (X) | X | X | X |
| (F) Coagulant-aqueous solution: | | | |
| 2% aluminum sulfate [1] | 10 | 6 | |
| 2% zinc sulfate | | | 6 |
| (G) Combine (E) and (F): | | | |
| Blend, (X) | X | X | X |
| Silica in serum | None | None | None |
| (H) Masterbatch: | | | |
| Filter and wash (X) | X | X | X |
| Dried (105° C.) (X) | X | X | X |

[1] Aluminum sulfate $Al_2(SO_4)_3 \cdot 14H_2O$
[2] Antioxidant 2,2'-methylene-bis-(4-methyl-6-t.-butylphenol).

TABLE XVIII

Silica-polymer masterbatch with carbon black and processing oil
[Parts by wt.]

| Example | 48 | 49 | 50 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent-aqueous solution: | | | |
| 2% aluminum sulfate [1] | 8.5 | | |
| 2% zinc sulfate | | 6.8 | |
| 2% sulfuric acid | | | 4.5 |
| (C) Combine (A) and (B): Blend, (X) | X | X | X |
| (D) Carbon black and processing oil: | | | |
| Thermax [2] | 5 | | |
| Statex 160HR [2] | | 5 | |
| Philblack O [2] | | | 5 |
| Circosol 2XH [3] | 1 | | |
| (E) Combine (C) and (D): Blend [4] min | 0.5 | 0.5 | 0.5 |
| (F) Elastomer latex—Ex. IX: | | | |
| Example 19, table VIII | 79 | | |
| Example 22, Table IX | | 68 | |
| Example 21, Table IX | | | 115 |
| Dry solids basis | 15 | 15 | 15 |
| Water | 100 | 100 | 100 |
| Antioxidant [5] | 0.3 | 0.3 | 0.3 |
| (G) Combine (E) and (F): Blend, (X) | X | X | X |
| (H) Reactant-aqueous solution: | | | |
| 2% aluminum sulfate [1] | 25 | | |
| 2% zinc sulfate | | 37 | |
| 2% calcium chloride | | | 12 |
| Water | 50 | 50 | 50 |
| (I) Combine (G) and (H): | | | |
| Blend, (X) | X | X | X |
| pH | 4.5 | 6.4 | 3.5 |
| Silica and/or carbon black in serum | None | None | None |
| (J) Masterbatch: | | | |
| Filter and wash (X) | X | X | X |
| Dried (105° C.) (X) | X | X | X |

[1] Aluminum sulfate Al$_2$(SO$_4$)$_3$·14H$_2$O
[2] Carbon black, a trademark product.
[3] Processing oil, a trademark product.
[4] Waring blender, a trademark product.
[5] Antioxidant 2,2'-methylene-bis-(4-methyl-6-t.-butylphenol).

TABLE XIX

Silica-polymer masterbatch
[Parts by wt.]

| Example | 51 | 52 | 53 |
|---|---|---|---|
| (A) Silica pigment slurry: | | | |
| Alkaline silica pigment-I (pH=8.5-9.5) | 25 | 25 | 25 |
| Dry solids basis | 2.5 | 2.5 | 2.5 |
| Water | 40 | 40 | 40 |
| (B) Reagent-aqueous solution: 2% aluminum sulfate [1] | 8.5 | 8.5 | 8.5 |
| (C) Combine (A) and (B): Blend and filter (X) | X | X | X |
| (D) Processing oil: Circosol 2XH [2] | 0.6 | 0.6 | 0.6 |
| (E) Carbon black: Thermax [3] | 5 | 5 | 5 |
| (D) Blend (C), (D), and (E): Blender [4], min | 0.5 | 0.5 | 0.5 |
| (E) Elastomer latex table: | | | |
| Example 18 | 43 | 43 | 43 |
| Dry solids basis | 15 | 15 | 15 |
| Water | 50 | 50 | 50 |
| Antioxidant [5] | 0.3 | 0.3 | 0.3 |
| (F) Combine (D) and (E): Blend, (X) | X | X | X |
| (G) Reactant-aqueous solution: | | | |
| 2% aluminum sulfate [1] | 28 | | |
| 2% magnesium sulfate | | 30 | 0 |
| 2% sulfuric acid | | | 11.5 |
| Water | 100 | 100 | 100 |
| (H) Combine (F) and (G): | | | |
| Blend, (X) | X | X | X |
| pH | 4.5 | 6.4 | 3.5 |
| Silica and/or carbon black in serum | None | None | None |
| (I) Masterbatch: | | | |
| Filter and wash (X) | X | X | X |
| Dried (105° C.) (X) | X | X | X |

[1] Aluminum sulfate Al$_2$(SO$_4$)$_3$·14H$_2$O.
[2] Processing oil, a trademark product.
[3] Carbon black, a trademark product.
[4] Waring blender, a trademark product.
[5] Antioxidant 2,2'-methylene-bis-(4-methyl-6-t.-butylphenol).

TABLE XX

Silica-polymer masterbatch
[Parts by wt.]

| Example | 54 | 55 | 56 | 57 |
|---|---|---|---|---|
| (A) Silica pigment slurry: | | | | |
| Alkaline silica pigment-I (pH=8.5-9.5) | 25 | 25 | 25 | 25 |
| Dry solids basis | 2.5 | 2.5 | 2.5 | 2.5 |
| Water | 40 | 40 | 40 | 40 |
| (B) Reagent-aqueous solution: 2% calcium chloride | 8 | 8 | | |
| (C) Combine (A) and (B): Blend, (X) | X | X | X | X |
| (D) Processing oil: Circosol 2XH [1] | 0.6 | 0.6 | 0.6 | 0.6 |
| (E) Carbon black: | | | | |
| Statex 160HR [2] | 5 | 5 | | |
| Philblack O [2] | | | 5 | 5 |
| (D) Blend (C), (D) and (E): Blender,[3] min | 0.5 | 0.5 | 0.5 | 0.5 |
| (E) Elastomer latex table VIII: | | | | |
| Example 20 | 52 | 52 | | |
| Example 19 | | | 79 | 79 |
| Dry solids basis | 15 | 15 | 15 | 15 |
| Water | 60 | 60 | 80 | 80 |
| Antioxidant [4] | 0.3 | 0.3 | 0.3 | 0.3 |
| (F) Combine (D) and (E): Blend, (X) | X | X | X | X |
| (G) Reactant-aqueous solution: | | | | |
| 2% aluminum sulfate [5] | 31 | | 40 | |
| 2% zinc sulfate | | 20 | | 30 |
| Water | 120 | 120 | 120 | 120 |
| (H) Combine (F) and (G): | | | | |
| Blend, (X) | X | X | X | X |
| pH | 4.0 | 6.0 | 4.0 | 5.5 |
| Silica and/or carbon black in serum | None | None | None | None |
| (I) Masterbatch: | | | | |
| Filter and wash (X) | X | X | X | X |
| Dried (105° C.) (X) | X | X | X | X |

[1] Processing oil, a trade mark product.
[2] Carbon black, a trademark product.
[3] Waring blender, a trademark product.
[4] Antioxidant 2,2'-methylene-bis-(4-methyl-6-t.-butylphenol).
[5] Aluminum sulfate Al$_2$(SO$_4$)$_3$·14H$_2$O.

The masterbatches prepared in accordance with the present invention may be compounded with vulcanizing ingredients and vulcanized by any suitable recipe (e.g. the recipe set forth in Table I, above) to form useful vulcanizates.

From the foregoing disclosure, it will be appreciated, inter alia, that the present invention improves elastomer-silica pigment masterbatches by forming the same with elastomers provided with certain substituent groups improving the compatability of the elastomer with the aqueously wet silica pigment.

In certain co-pending applications filed concurrently herewith, different modes of improving elastomer-silica pigment masterbatches are provided by employing wet silica pigment rendered more compatable with elastomers by combining with the wet silica pigment certain conditioning materials.

To maintain clear lines of division between the co-pending applications the claims of this application recite, and rely for patentability on, only its own improvements, without prejudice to their applicability to processes or products employing such improvements along with a different improvement disclosed in one of said co-pending applications.

Also, while there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:

1. A process for the curbing of silica pigment losses and the promotion of uniformity of product in the preparation of a silica pigment-elastomer masterbatch from:
   (a) aqueously wet silica pigment and
   (b) an aqueous dispersion of elastomer, which process comprises the steps of:
   (c) providing 5 to 100 parts by weight, dry basis, of aqueously wet hydrated silica pigment precipitate which has a bound alkali content in the range of 0.1 to 10% by weight as Na₂O; which has been prepared by precipitation from an aqueous solution of alkali-metal silicate with the aid of carbon dioxide and filtered and washed; and which has continuously been maintained in an aqueously wet state without subjection to drying after its precipitation;

(d) providing an aqueous dispersion of elastomer containing (1) 100 parts of the elastomer by weight and (2) from 0.5 to 15 parts by weight of anionic dispersing agent, (3) the elastomer of said dispersion consisting essentially of hydroxy containing elastomer having from 0.1 to 10% of its weight consisting of its substituent hydroxyl groups;

(e) providing reactant selected from the class consisting of the members of the following groups: Group (I), the water soluble salts of aluminum or zinc; Group (II), the water soluble salts of the alkaline earth metals; Group (III), the water soluble acids; and Group (IV), combinations of any two or more members of the foregoing groups;

(f) combining the wet silica pigment provided by step (c) with from 0 to at least a stoichiometric equivalent, based on the alkalinity of the silica pigment, of reactant provided by step (e); thereby to provide a wet silica pigment for use in step (g);

(g) combining the aqueous elastomer dispersion provided by step (d), together with (1) the aqueously wet silica pigment precipitate provided by step (f), (2) from 0 to 75 parts by weight of carbon black with the limitation that the total of silica pigment and carbon black, dry basis, not exceed 80 parts by weight and (3) from 0 to 45 parts by weight of processing oil, with a sufficient quantity of the reactant provided in step (e) to cause coagulation of the solids of the combination, whereby there is formed a coagulum of such solids rendering the aqueous serum of the combination essentially free of silica pigment; and (h) recovering the coagulum as a masterbatch.

2. A process for preparing a masterbatch from wet silica pigment and an aqueous dispersion of elastomer as claimed in claim 1, in which the elastomer of the aqueous dispersion provided in step (d) is a hydroxy containing polymer prepared by aqueous dispersion polymerization of ethylenically unsaturated monomer material consisting at least in part of a quantity of hydroxy containing monomer material having sufficient hydroxyl groups therein to form the hydroxy containing elastomer.

3. A process for preparing a masterbatch from wet silica pigment and an aqueous dispersion of elastomer as claimed in claim 1, in which the elastomer of the aqueous dispersion provided in step (d) is a hydroxy containing graft polymer prepared by (1) forming a precursor polymer by aqueous dispersion polymerization of ethylenically unsaturated monomer material, and (2) thereafter grafting hydroxy containing monomer material thereto by aqueous graft polymerization.

4. A process as defined in claim 1, wherein in step (f) the aqueously wet silica pigment precipitate provided by step (c) is combined with at least a sufficient quantity to substantially neutralize the alkalinity of the wet silica pigment of the reactant provided in step (e).

5. A process as defined in claim 1, in which the aqueous hydroxy containing elastomer dispersion and the aqueously wet silica pigment precipitate being subjected to step (g) are pre-mixed before being combined with the reactant referred to in step (g).

6. A process as claimed in claim 3, in which the combining of the mixture of aqueous elastomer dispersion and silica pigment with the reactant as referred to in step (g) is effected by adding said mixture to an aqueous solution of the reactant.

7. A process as claimed in claim 1, in which at least 5 parts by weight of carbon black are employed in step (g).

8. A process as claimed in claim 1, in which at least 5 parts by weight of processing oil are employed in step (g).

References Cited

UNITED STATES PATENTS

| 2,821,232 | 1/1958 | Wolf | 152—330 |
| 3,042,661 | 7/1962 | Kirshenboum et al. | 260—83.3 |
| 3,061,577 | 10/1962 | Pruett | 260—41 |
| 3,172,726 | 3/1965 | Burke et al. | 23—182 |
| 3,250,594 | 5/1966 | Burke et al. | 23—182 |
| 3,314,911 | 4/1967 | Cull | 260—29.7 |
| 3,392,140 | 7/1968 | Maahs et al. | 260—41.5 |
| 3,401,213 | 9/1968 | Trementozzi | 260—880 |

OTHER REFERENCES

Whitby, G. S., Synthetic Rubber, John Wiley & Sons, Inc., New York, 1954, pages 670 and 677.

Morton, Maurice, Introduction to Rubber Technology, Reinhold Pub. Corp., New York, 1959, pages 169–171.

ALLAN LIEBERMAN, Primary Examiner

J. H. DERRINGTON, Assistant Examiner

U.S. Cl. X.R.

260—34.2, 41 R, 41 A, 41.5 R, 41.5 A, 41.5 MP, 746